(12) United States Patent
Englekirk (10) Patent No.: US 11,011,981 B1
(45) Date of Patent: May 18, 2021

(54) DIFFERENTIAL CLOCK LEVEL TRANSLATOR FOR CHARGE PUMPS

(71) Applicant: pSemi Corporation, San Diego, CA (US)

(72) Inventor: Robert Mark Englekirk, Littleton, CO (US)

(73) Assignee: pSemi Corporation, San Diego, CA (US)

( * ) Notice: Subject to any disclaimer, the term of this patent is extended or adjusted under 35 U.S.C. 154(b) by 0 days.

(21) Appl. No.: 17/010,060

(22) Filed: Sep. 2, 2020

(51) Int. Cl.
*H02M 3/07* (2006.01)

(52) U.S. Cl.
CPC ...... *H02M 3/073* (2013.01); *H02M 2003/075* (2013.01)

(58) Field of Classification Search
None
See application file for complete search history.

(56) References Cited

U.S. PATENT DOCUMENTS

| | | | | |
|---|---|---|---|---|
| 9,190,902 | B2* | 11/2015 | Burgener | H03K 3/0315 |
| 9,979,284 | B2* | 5/2018 | Jung | H03K 19/017509 |
| 9,998,002 | B2* | 6/2018 | Englekirk | H02M 3/07 |
| 10,447,153 | B2* | 10/2019 | Raimar | H02M 3/073 |

* cited by examiner

*Primary Examiner* — Jeffery S Zweizig
(74) *Attorney, Agent, or Firm* — Jaquez Land Greenhaus LLP; John Land, Esq.

(57) ABSTRACT

Circuits and methods for improved clock signal level shifting in charge pumps that avoids shoot-through current and loss due to simultaneous switching, which may be powered by $V_{IN}$ or any available level of $V_{DD}$, and which provides a high level of clock signal voltage swing. Embodiments include a non-overlapping clock generator that generates a set of separate non-overlapping clock signals that are applied to a differential clock level translator coupled to a charge pump. The differential clock level translator level shifts the set of non-overlapping clock signals to a set of level-shifted non-overlapping clock signals. The charge pump is configured to receive the sets of non-overlapping clock signals and apply them to corresponding NMOS and PMOS switches. The set of level-shifted non-overlapping clock signals have shifted voltages sufficient to switch corresponding switches having elevated source voltages $V_S$. The charge pump may be a differential charge pump in some embodiments.

15 Claims, 9 Drawing Sheets

FIG. 5A
NMOS Clock Latch

FIG. 5B

FIG. 6A
PMOS Clock Latch

DIFFERENTIAL CLOCK LEVEL TRANSLATOR FOR CHARGE PUMPS

BACKGROUND

(1) Technical Field

This invention generally relates to electronic power supplies, and more specifically to energy transfer DC-to-DC converters (DC/DC converters), such as charge pumps.

(2) Background

DC/DC converter power supply circuits provide a DC output voltage based upon a DC source voltage, where the output voltage is typically different than the input voltage. As the term is used herein, DC/DC converters do not encompass voltage reduction regulator circuits that use a linear pass device, but rather involve energy transfer from input to output through an energy storage device, such as a capacitor or an inductor.

A type of DC/DC converter is a "charge pump", which obtains energy for the output voltage primarily by means of capacitive transfer from the source to the output. Energy transfer capacitors used in charge pumps are typically known as "fly capacitors" or "fly caps". A charge pump may derive an output voltage that is higher than a source voltage, or that is inverted from a source voltage, or that is referenced to a different voltage than the source voltage, and may do all of these things concurrently. Hybrid devices are possible that employ inductive energy transfer in addition to capacitive energy transfer.

Figure 1:
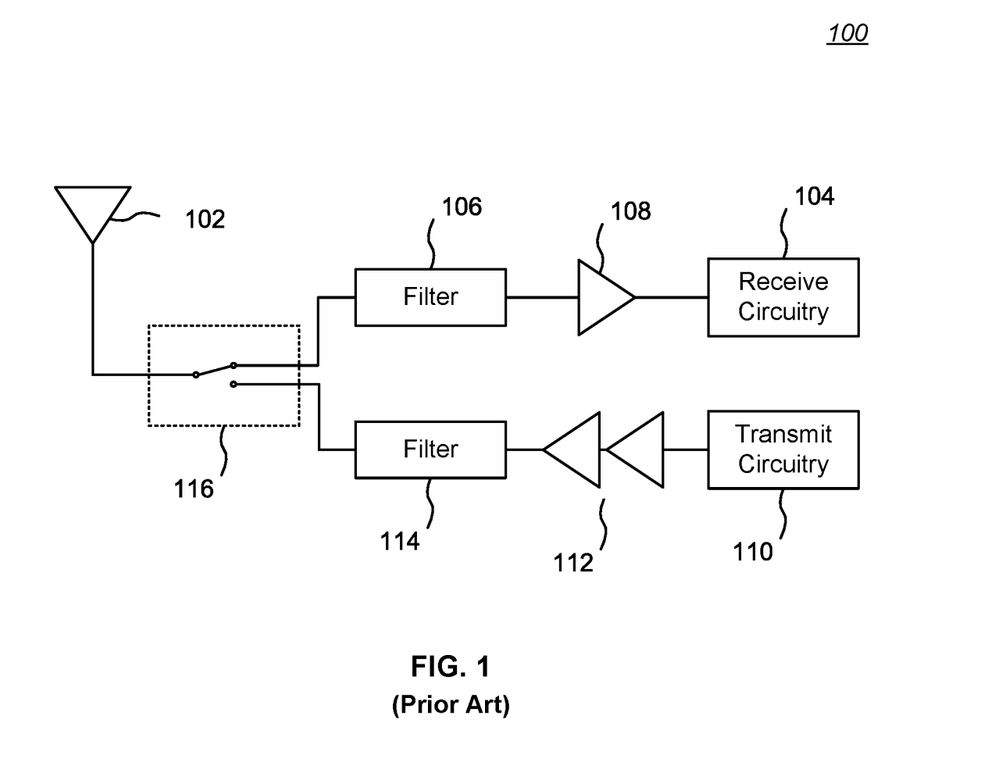
FIG. 1 is a block diagram of a prior art time division duplex (TDD) wireless transceiver.

Charge pumps may be implemented for a wide variety of purposes. They are well suited for integrated circuit fabrication because the devices and elements required are compatible with most integrated circuit fabrication techniques. For example, a charge pump may be employed to generate a gate bias supply for an integrated circuit that switches an antenna between send and receive circuitry of a transceiver. For example, FIG. 1 is a block diagram of a prior art time division duplex (TDD) wireless transceiver 100. Many wireless transceivers, such as cellular telephones, employ a single antenna for both receiving and transmitting. While such systems are receiving, an antenna 102 is coupled to receive circuitry 104 through, for example, a filter 106 and a low noise amplifier (LNA) 108. However, while such systems are transmitting, the antenna 102 is isolated from the sensitive LNA 108 and coupled instead to relatively high power transmit circuitry 110 through, for example, a power amplifier 112 and a transmit filter 114. Note that the circuit shown in FIG. 1 is schematically simple for ease of understanding; in an actual implementation, there may be multiple transmit and receive circuits and a more complex radio frequency (RF) switching configuration.

An RF switch 116 may be used to perform such antenna switching functions, as well as RF switching functions in general. Ideally, such switches may be integrated together with the receive and/or transmit circuitry, and in any event are desirably very small, due to integrated circuit die cost and space limitations in portable transceivers such as cellular telephones and electronic tablets. In order to achieve good performance from switching devices (e.g., field effect transistors, or FETs) used to implement such RF switches, many designs need a power supply voltage that is greater than the voltage supplied, for example, by a battery. In view of the space and cost constraints of transceiver units such as cellular telephones, a charge pump is particularly suitable for generating such a power supply because it can be readily integrated into a very small circuit and requires only a single external voltage source, eliminating the need for multiple power supplies.

In a simple single-stage charge pump, one capacitor is used as a "fly" capacitor, and one capacitor is used for a storage capacitor. The fly capacitor will alternately charge to some supply voltage $V_{IN}$ and then be switched to some other connection geometry to discharge into the "pumped" voltage supply, which is the new voltage supply $V_{OUT}$ being generated.

Figure 2:
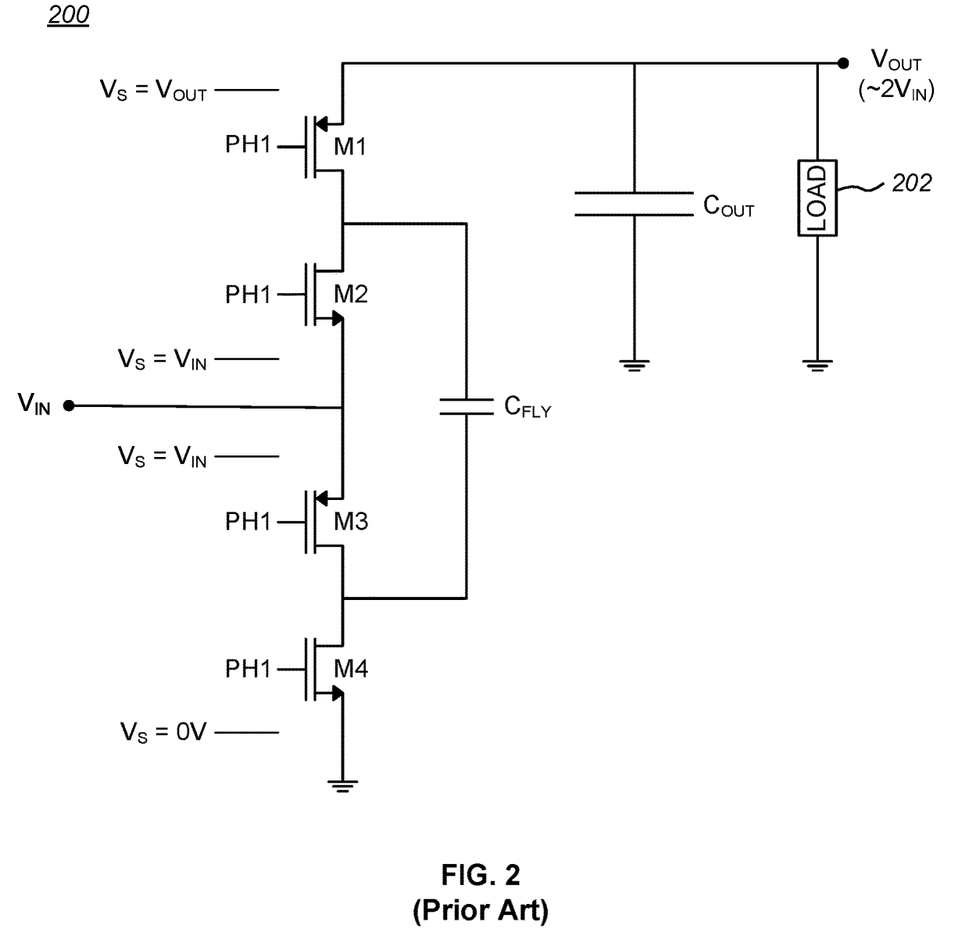
FIG. 2 is a schematic circuit diagram showing a prior art single-stage charge pump configured with NMOS and PMOS FET switches and having a 2× conversion ratio.

FIG. 2 is a schematic circuit diagram showing a prior art single-stage charge pump 200 configured with NMOS and PMOS FET switches and having a 2× conversion ratio. When an applied clock phase PH1 is "high", the NMOS FET switches M2 and M4 are closed and the PMOS FET switches M1 and M3 are open, thereby coupling the positive (upper) terminal of the fly capacitor $C_{FLY}$ to a supply voltage $V_{IN}$ and the negative (lower) terminal to circuit ground, thus charging $C_{FLY}$ to $V_{IN}$. Conversely, when PH1 is "low", the NMOS FET switches M2 and M4 are open and the PMOS FET switches M1 and M3 are closed, thereby coupling the positive terminal of the fly capacitor $C_{FLY}$ to a storage capacitor Com' and the negative terminal to $V_{IN}$, thus charging $C_{OUT}$ toward an output voltage $V_{OUT}$ of approximately $2V_{IN}$ (assuming no load and minimal charge loss). Note that the actual voltage of the applied clock phase PH1 generally requires translation to higher levels for switches M1 and M2.

The charge stored in $C_{OUT}$ may be coupled to a load 202. In some embodiments, an essentially identical single-stage charge pump (i.e., FETs M1-M4 and fly capacitor $C_{FLY}$) may be coupled in parallel with the illustrated single-stage charge pump 200 but with the clock phases reversed, forming a differential charge pump having a smoother output at $V_{OUT}$ and capable of supporting a larger load 202.

An issue that arises with conventional charge pump designs of the type shown in FIG. 2 is that the clock signals that drive the ON/OFF state of the switches M1 and M2 generally need to be level-shifted outside the supply voltage range. For example, in FIG. 2, while the source voltage $V_S$ for the "lower" (ground side) switches M3, M4 are $V_{IN}$ and 0V respectively, the source voltage $V_S$ for the "upper" (output side) switches M1, M2 are $V_{OUT}$ and $V_{IN}$ respectively (noting that $V_{OUT}$ may be 0V at startup before transitioning to about $2V_{IN}$). Thus, in order to apply a gate-source voltage $V_{GS}$ sufficient to switch the ON/OFF state of switches M1, M2, the clock signals for those switches must be level shifted to a voltage range commensurate with the corresponding $V_S$. This level-shifted voltage range exceeds the available voltage at $V_{IN}$, or perhaps even the supply voltage, $V_{DD}$. Since $V_{OUT}$ may not have been boosted yet from a starting state of 0V to a sufficiently high voltage, the range of level shifting required is variable and significant.

Conventional level shifters may use DC blocking capacitors to shift an input voltage range for the clock signal to a desired output voltage range. However, this approach requires a method to restore DC on the other side of the DC blocking capacitors each clock cycle, such as some combination of FETs, diodes, and resistors to relate the clock signal voltage to the source voltages of each of the FET switches M1-4. A drawback of a resistor-only approach is that the resistor would restore DC such that the $V_{GS-ON}$ voltage is only $V_{DD}/2$ for the upper switches M1, M2, which means half of the available clock signal voltage is lost for switching purposes. In any approach for low power, to avoid shoot-through current and loss due to simultaneous switching of the NMOS and PMOS FETs, some form of non-overlap must be designed in. This may be through non-overlap of switching times, or through voltage non-overlap by skewing the restore voltages of the PMOS and NMOS from each other as in the resistor-only approach. However, such "clock voltage separation" can limit the drive efficiency because of a reduced available $V_{GS}$-ON voltage for a switch.

Accordingly, there is a need for improved clock signal level shifting in charge pumps that avoids shoot-through current and loss due to simultaneous switching, which is powered by $V_{IN}$ or any available level of $V_{OUT}$, and which provides a high level of clock signal voltage swing. The present invention addresses this need.

SUMMARY

The invention encompasses circuits and methods for improved clock signal level shifting in charge pumps that avoids shoot-through current and loss due to simultaneous switching, which may be powered by $V_{IN}$ or any available level of $V_{OUT}$, and which provides a high level of clock signal voltage swing.

Embodiments include a conventional oscillator or clock source that provides a periodic waveform to a non-overlapping clock generator. The non-overlapping clock generator generates a set of separate non-overlapping clock signals that are applied to a differential clock level translator coupled to a charge pump. The non-overlapping clock signals are generated and applied to the charge pump in a manner that will cause all PMOS switches to be turned OFF before the NMOS switches are turned ON, and then cause all NMOS switches to be turned OFF before the PMOS switches are turned back on.

The differential clock level translator level shifts the set of non-overlapping clock signals to a set of level-shifted non-overlapping clock signals without a significant loss in voltage swing. The set of non-overlapping clock signals from the non-overlapping clock generator and the set of level-shifted non-overlapping clock signals from the differential clock level translator are applied to the charge pump.

The charge pump is configured to receive the sets of non-overlapping clock signals (including level-shifted clock signals) and apply them to corresponding NMOS and PMOS switches with gate-source voltages $V_{GS}$ ranging from 0V to about $+V_{DD}$ (for NMOS switches) or from zero 0V to about $-V_{DD}$ (for PMOS switches). The set of level-shifted non-overlapping clock signals have shifted voltages sufficient to switch corresponding switches having elevated source voltages $V_S$. The charge pump may be a differential or multiphase charge pump in some embodiments.

The details of one or more embodiments of the invention are set forth in the accompanying drawings and the description below. Other features, objects, and advantages of the invention will be apparent from the description and drawings, and from the claims.

DESCRIPTION OF THE DRAWINGS

Like Reference Numbers and Designations in the Various Drawings Indicate Like Elements.

DETAILED DESCRIPTION

The invention encompasses circuits and methods for improved clock signal level shifting in charge pumps that avoids shoot-through current and loss due to simultaneous switching, which may be powered by $V_{IN}$ or any available level of $V_{OUT}$, and which provides a high level of clock signal voltage swing.

General Embodiment

Figure 3:
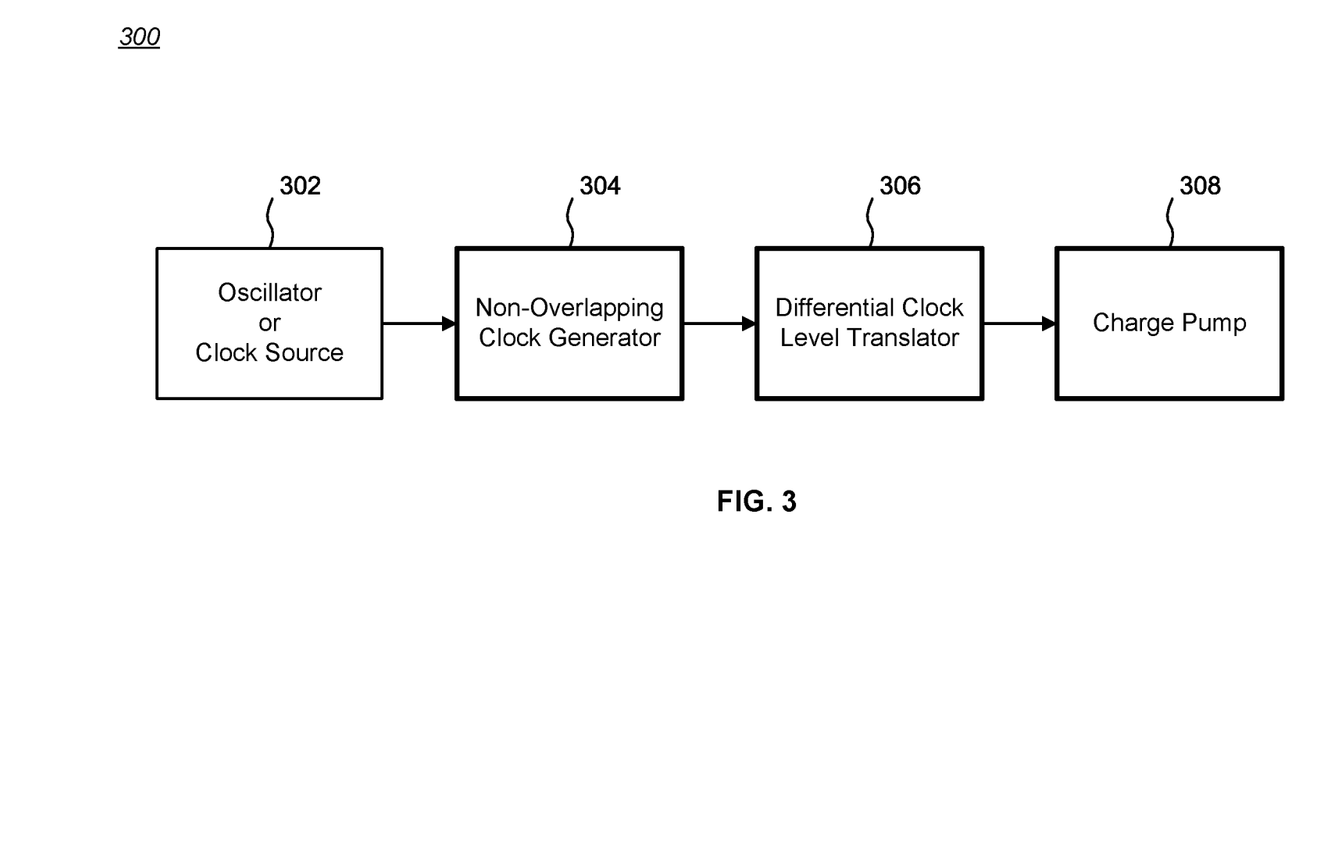
FIG. 3 is a block diagram illustrating the broadest concepts of the invention. A conventional oscillator or clock source provides a periodic waveform to a non-overlapping clock generator.

FIG. 3 is a block diagram 300 illustrating the broadest concepts of the invention. A conventional oscillator or clock source 302 provides a periodic waveform to a non-overlapping clock generator 304. The non-overlapping clock generator 304 generates a set of separate non-overlapping clock signals that are applied to a differential clock level translator 306 coupled to a charge pump 308. The non-overlapping clock signals are generated and applied to the charge pump 308 in a manner that will cause all PMOS switches to be turned OFF before the NMOS switches are turned ON, and then cause all NMOS switches to be turned OFF before the PMOS switches are turned back on.

The differential clock level translator 306 level shifts the set of non-overlapping clock signals to a set of level-shifted non-overlapping clock signals without a significant loss in voltage swing. The set of non-overlapping clock signals from the non-overlapping clock generator 304 and the set of level-shifted non-overlapping clock signals from the differential clock level translator 306 are applied to the charge pump 308.

Level shifting is preferably by means of small latch circuits and DC blocking capacitors. Because of the "off-before-on" nature of the non-overlapping clock signals, the latches never have to be overridden to flip the latch state as in typical logic translators, and no charge is lost in the charge pump 308 output $V_{OUT}$. The latches are only responsible for DC restoration across the DC blocking capacitors, which involves only small currents, and accordingly need not handle the charge pump current.

The charge pump 308 is configured to receive the sets of non-overlapping clock signals (including level-shifted clock signals) and apply them to corresponding NMOS and PMOS switches with gate-source voltages $V_{GS}$ ranging from 0V to about $+V_{DD}$ (for NMOS switches) or from zero 0V to about $-V_{DD}$ (for PMOS switches). The set of level-shifted non-overlapping clock signals have shifted voltages sufficient to switch corresponding switches having elevated source voltages $V_S$. The charge pump 308 may be a differential or multi-phase charge pump in some embodiments.

Example Non-Overlapping Clock Generator

Figure 4A:
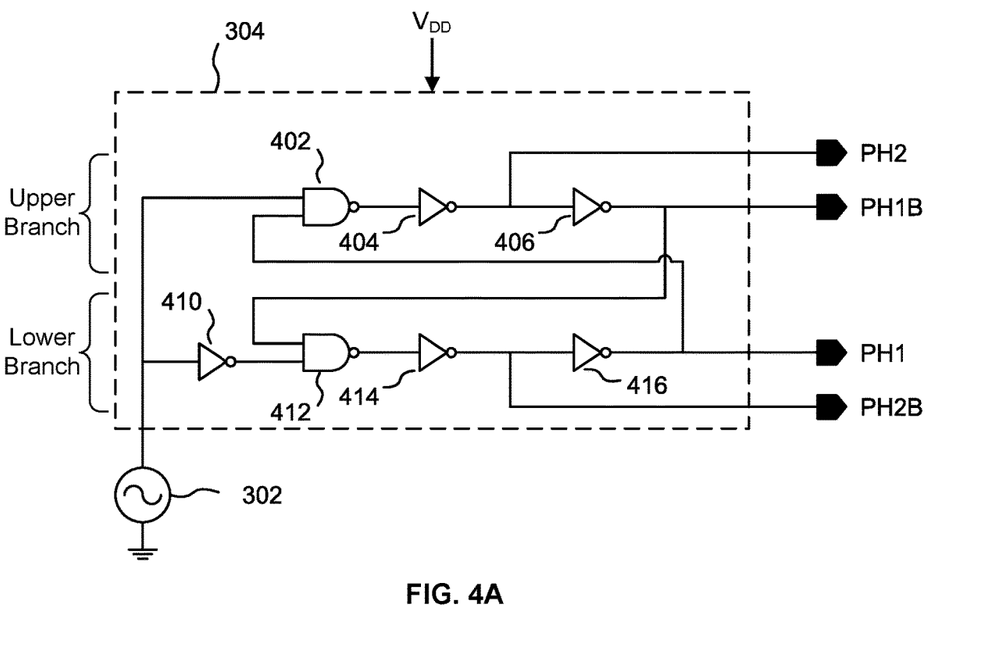
FIG. 4A is a schematic diagram of one embodiment of the non-overlapping clock generator of FIG. 3.

FIG. 4A is a schematic diagram of one embodiment of the non-overlapping clock generator 304 of FIG. 3. A periodic waveform from the oscillator or clock source 302 is coupled to two cross-coupled branches. An "upper" branch includes a first NAND gate 402 having a first input coupled to the periodic waveform and series-coupled to a first inverter 404 and a second inverter 406. A "lower" branch includes a third inverter 410 coupled to the periodic waveform and series-coupled to a first input of a second NAND gate 412, which in turn is series-coupled a fourth inverter 414, and a fifth inverter 416.

The output of the first inverter 404 is a first clock signal PH2. The output of the second inverter 406 is a second clock signal PH1B, which is also coupled to a second input of the second NAND gate 412.

The output of the fifth inverter 416 is a third clock signal PH1, which is also coupled to a second input of the first NAND gate 402. The output of the fourth inverter 414 is a fourth clock signal PH2B.

Figure 4B:
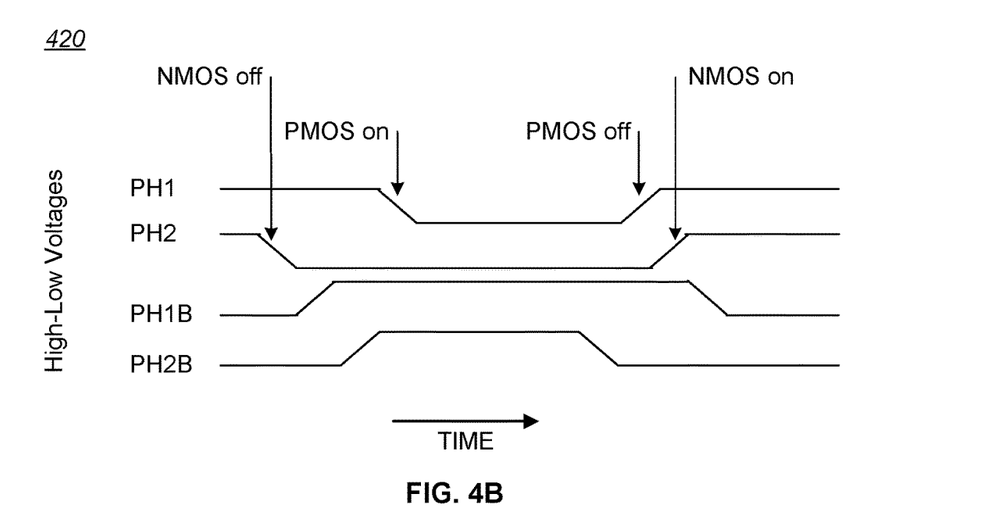
FIG. 4B is a set of timing diagrams showing relative state transitions of the set of clock signals output by the non-overlapping clock generator.

FIG. 4B is a set of timing diagrams 420 showing relative state transitions of the set of clock signals output by the non-overlapping clock generator 304. As illustrated, PHI is LOW only when PH2 is already LOW, and PH2 is HIGH only when PH1 is already HIGH. Similarly, PH1B is LOW only when PH2B is already LOW, and PH2B is HIGH only when PH1B is already HIGH. In addition, PH1 and PH1B are not in a LOW state simultaneously, and PH2 and PH2B are not in a HIGH state simultaneously. Note that PH1B is essentially an inverted and slightly delayed version of PH2, and PH2B is essentially an inverted and slightly advanced version of PH1 ("B" is for "bar", or inversion).

While FIG. 4A shows one embodiment of the non-overlapping clock generator 304 of FIG. 3, it should be appreciated that other circuits may be devised that output a set of non-overlapping clock signals like those shown in FIG. 4B. For example, a set of non-overlapping clock signals may be generated by known programmable delay circuits or known digital synthesis circuits.

As described in greater detail below, the PH1 and PH2 clock signals may be applied directly to respective PMOS and NMOS "lower" (ground side) switches of a charge pump 308 without level shifting. PH1 going LOW will turn the corresponding PMOS FET to an ON state, while PH1 going HIGH will turn the corresponding PMOS FET to an OFF state. PH2 going LOW will turn the corresponding NMOS FET to an OFF state, while PH2 going HIGH will turn the corresponding NMOS FET to an ON state.

Also as described in greater detail below, the PH1 and PH2 clock signals must be level-shifted by the differential clock level translator 306 before resulting clock signals are applied to respective PMOS and NMOS "upper" (output side) switches of a charge pump 308.

Example Differential Clock Level Translators

Figure 5A:
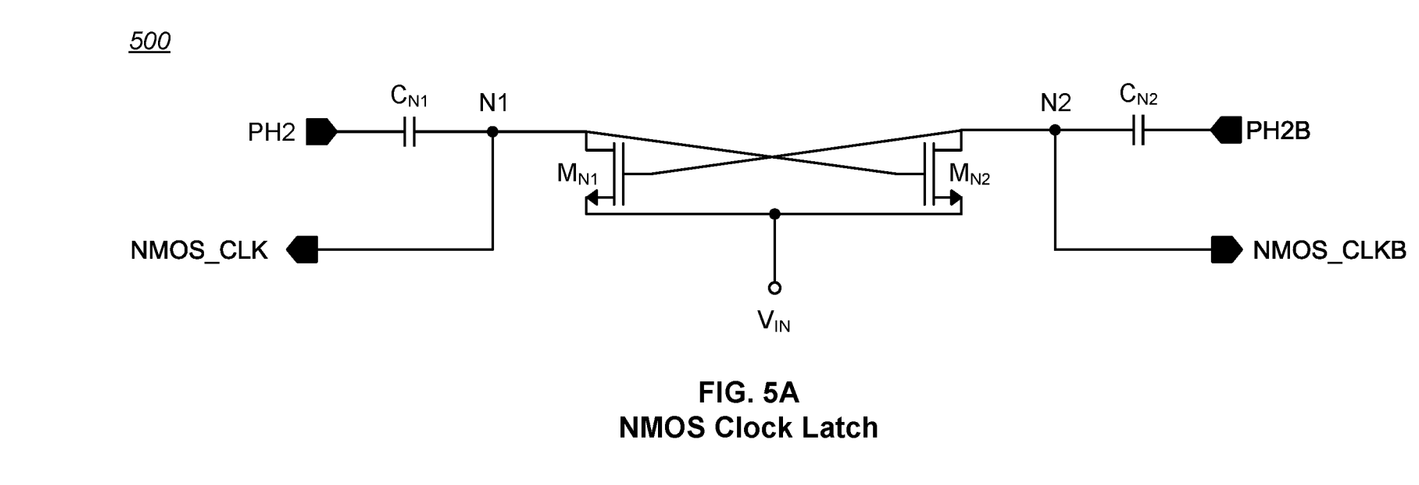
FIG. 5A is a schematic diagram of a first differential clock level translator for generating level-shifted clock signals for NMOS "upper" (output side) switches of a charge pump.

FIG. 5A is a schematic diagram of a first differential clock level translator 500 for generating level-shifted clock signals for NMOS "upper" (output side) switches of a charge pump 308. In the illustrated example, the PH2 clock signal from the non-overlapping clock generator 304 is coupled through a first capacitor $C_{N1}$ to the drain-source channel of a first NMOS FET $M_{N1}$ and to the gate of a second NMOS FET $M_{N2}$. The drain-source channel of the first FET $M_{N1}$ is coupled to the input voltage, $V_{IN}$, that is applied to the charge pump 308. Similarly, the PH2B clock signal from the non-overlapping clock generator 304 is coupled through a second capacitor $C_{N2}$ to the drain-source channel of the second FET $M_{N2}$ and to the gate of the first FET $M_{N1}$. The drain-source channel of the second FET $M_{N2}$ is also coupled to $V_{IN}$. The first FET $M_{N1}$ and the second FET $M_{N2}$ comprise a cross-coupled NMOS clock latch circuit. The non-overlapping input clock signals PH2 and PH2B typically vary from 0V (circuit ground) to about $V_{DD}$, the power supply voltage of the non-overlapping clock generator 304. The $V_{DD}$ supply voltage is generally from an external supply or internally regulated fixed supply typically (but not always) separate from the $V_{IN}$ voltage to the charge pump. Since $V_{DD}$ supplies power to the logic in the non-overlapping clock generator 304, the outputs of the non-overlapping clock generator 304 are nominally 0V to about $V_{DD}$.

The outputs of the first differential clock level translator 500 at nodes N1 and N2 respectively comprise an NMOS_CLK clock signal that is a level-shifted version of PH2 and an NMOS_CLKB clock signal that is a level-shifted version of PH2B. In essence, the charge alternately applied to the capacitors $C_{N1}$, $C_{N2}$ by the respective non-overlapping clock signals PH2, PH2B when they go HIGH is added to $V_{IN}$ to boost the voltage levels of the respective NMOS_CLK and NMOS_CLKB clock signals to about $V_{DT}$+ $V_{DD}$. At the same time, owing to the cross-coupling of FETs $M_{N1}$ and $M_{N2}$, when one clock signal PH2, PH2B goes HIGH and the other clock signal PH2B, PH2 goes LOW, the voltage at the opposite-side (with respect to the HIGH clock signal) node N2, N1 is brought back to about $V_{IN}$.

Figure 5B:
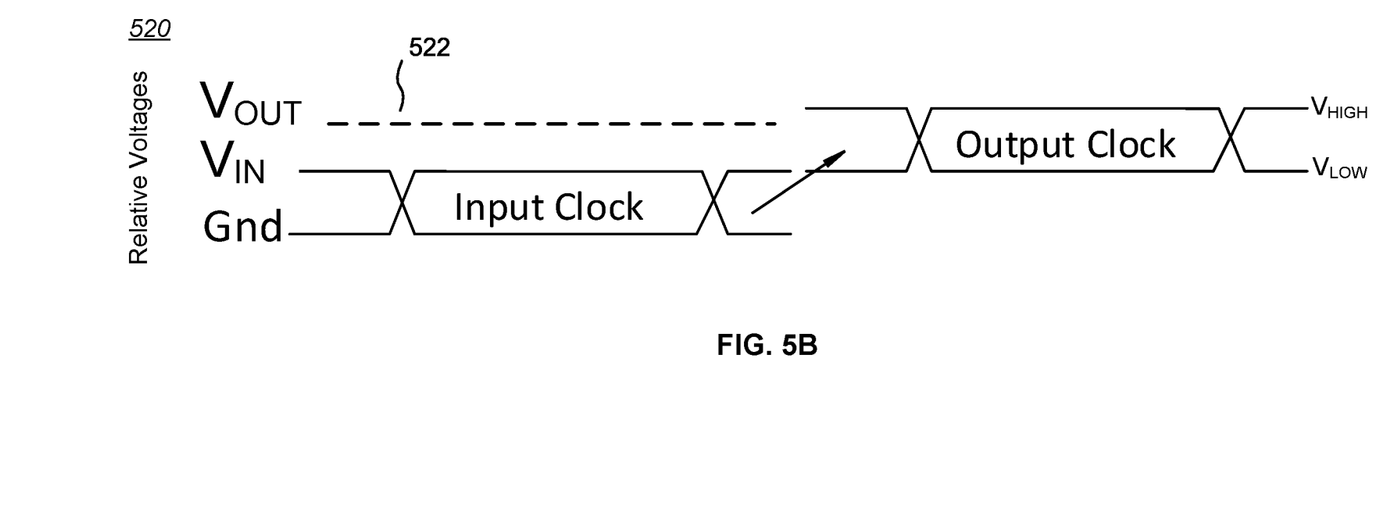
FIG. 5B is waveform diagram showing the relative voltages of the input clock signals applied to the first differential clock level translator, and the relative voltages of the level-shifted clock signals output by the first differential clock level translator.

FIG. 5B is waveform diagram 520 showing the relative voltages of the input clock signals applied to the first differential clock level translator 500, and the relative voltages of the level-shifted clock signals output by the first differential clock level translator 500. The relative value of $V_{OUT}$ when the charge pump 308 is fully operational is shown as a dashed line 522. Note that transitions of $V_{OUT}$ are not time-shifted relative to $V_{IN}$, rather, $V_{IN}$ and $V_{OUT}$ are offset to emphasize the relative voltage shift.

In the illustrated example, the non-overlapping input clock signals PH2 and PH2B vary from 0V (ground) to about $V_{DD}$; thus, the peak-to-peak input voltage $V_{IN-PP}$ equals about $V_{DD}$. The voltage-shifting characteristic of the first differential clock level translator 500 results in the corresponding level-shifted output clock signal NMOS_CLK, NMOS_CLKB having a low value, $V_{LOW}$, equal to about $V_{IN}$, and a high value, $V_{HIGH}$, equal to about $V_{IN}$+ $V_{DD}$. The high value, $V_{HIGH}$, will also be reduced by some loss due to charge redistribution (for example, between the OFF state capacitance, CUFF, of the FETs $M_{N1}$ and $M_{N2}$, the charge pump switch load (typically the FET switch M2 gate capacitance—see FIG. 7), and the capacitance of capacitors $C_{N2}$, $C_{N1}$ (see FIG. 5A)). Thus, the peak-to-peak output voltage $V_{OUT-PP}$ equals $V_{DD}$–loss.

Figure 6A:
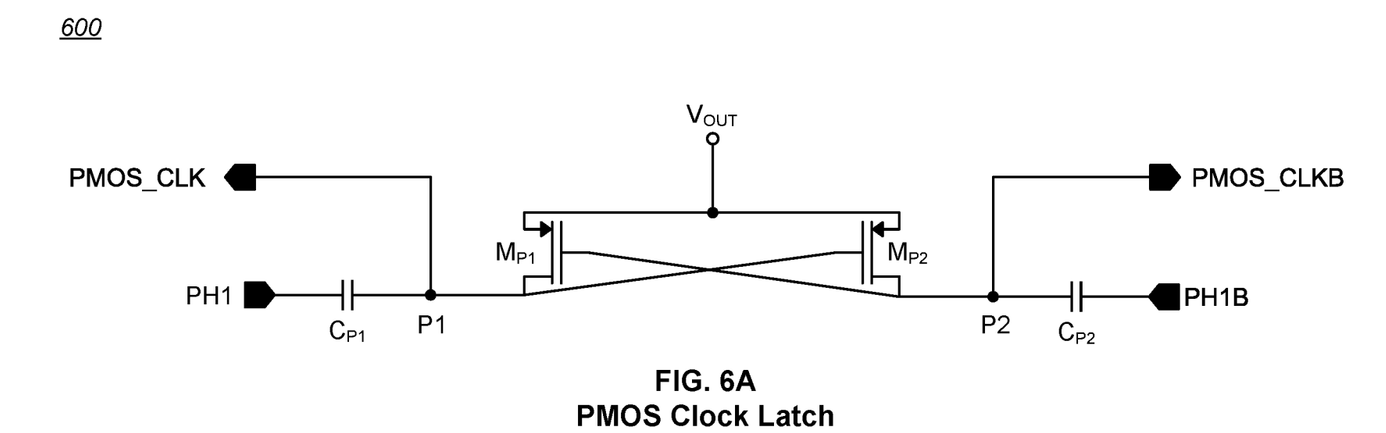
FIG. 6A is a schematic diagram of a second differential clock level translator for generating level-shifted clock signals for PMOS "upper" (output side) switches of a charge pump.

FIG. 6A is a schematic diagram of a second differential clock level translator 600 for generating level-shifted clock signals for PMOS "upper" (output side) switches of a charge pump 308. In the illustrated example, the PH1 clock signal from the non-overlapping clock generator 304 is coupled through a first capacitor $C_{P1}$ to the drain-source channel of a first PMOS FET $M_{P1}$ and to the gate of a second PMOS FET $M_{P2}$. The drain-source channel of the first FET $M_{P1}$ is coupled to the output voltage, $V_{OUT}$, that is generated by the charge pump 308. Similarly, the PH1B clock signal from the non-overlapping clock generator 304 is coupled through a second capacitor $C_{P2}$ to the drain-source channel of the second FET $M_{P2}$ and to the gate of the first FET $M_{P1}$. The drain-source channel of the second FET $M_{P2}$ is also coupled to $V_{OUT}$. The first FET $M_{P1}$ and the second FET $M_{P2}$ comprise a cross-coupled PMOS clock latch circuit. The non-overlapping input clock signals PH1 and PH1B vary from 0V (ground) to about $V_{DD}$.

The outputs of the second differential clock level translator 600 at nodes P1 and P2 respectively comprise a PMOS_CLK clock signal that is a level-shifted version of PH1 and a PMOS_CLKB clock signal that is a level-shifted version of PH1B. Owing to the cross-coupling of FETs $M_{P1}$ and $M_{P2}$, when one clock signal PH1, PH1B goes HIGH and the other clock signal PH1B, PH1 goes LOW, the voltage at the same-side (with respect to the HIGH clock signal) node P1, P2 is brought back to about $V_{OUT}$ (which may start out at 0V during startup of the charge pump 308). Accordingly, the PMOS_CLK and PMOS_CLKB clock signals have a $V_{HIGH}$ voltage equal to about $V_{OUT}$.

Conversely, when one clock signal PH1, PH1B goes LOW, this change in voltage also occurs at the corresponding output PMOS_CLK and PMOS_CLKB clock signals such that they are approximately $V_{OUT}$–$V_{DD}$ plus some loss due to charge redistribution.

Figure 6B:
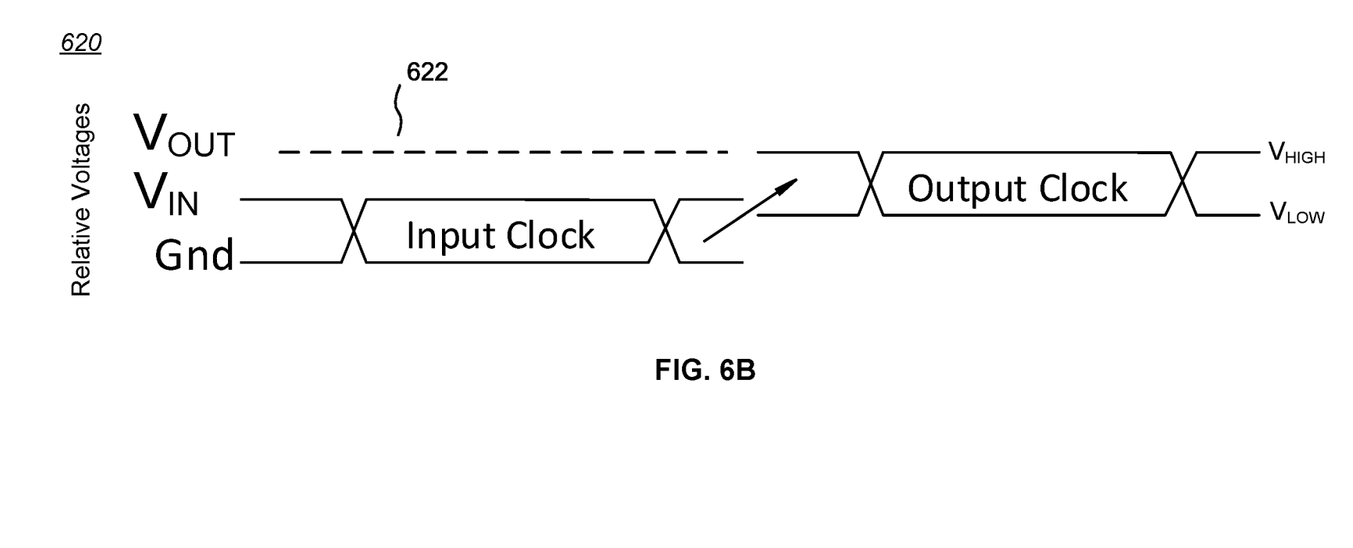
FIG. 6B is waveform diagram showing the relative voltages of the input clock signals applied to the second differential clock level translator, and the relative voltages of the level-shifted clock signals output by the second differential clock level translator.

FIG. 6B is waveform diagram 620 showing the relative voltages of the input clock signals applied to the second differential clock level translator 600, and the relative voltages of the level-shifted clock signals output by the second differential clock level translator 600. The relative value of $V_{OUT}$ when the charge pump 308 is fully operational is shown as a dashed line 622. Again, note that transitions of $V_{OUT}$ are not time-shifted relative to $V_{IN}$, rather, $V_{IN}$ and $V_{OUT}$ are offset to emphasize the relative voltage shift.

In the illustrated example, the non-overlapping input clock signals PH1 and PH1B vary from 0V (ground) to about $V_{DD}$; thus, the peak-to-peak input voltage $V_{IN-PP}$ equals about $V_{DD}$. The voltage-shifting characteristic of the second differential clock level translator 600 results in the corresponding level-shifted output clock signal PMOS_CLK, PMOS_CLKB having a low value, $V_{LOW}$, equal to about $V_{OUT}$–$V_{DD}$ plus loss, and a high value, $V_{HIGH}$, equal to about $V_{OUT}$. The peak-to-peak output voltage $V_{OUT-PP}$ equals about $V_{DD}$–loss. As should be clear, $V_{LOW}$ for the PMOS_CLK, PMOS_CLKB clock signals is more negative than their $V_{HIGH}$ levels, and level shifting will occur regardless of the value of $V_{OUT}$ (which, as noted above, may be 0V during startup of the charge pump 308).

In summary, the first differential clock level translator 500 generates non-overlapping NMOS_CLK and NMOS_CLKB clock signals having a $V_{LOW}$=about $V_{IN}$ and a $V_{HIGH}$=about $V_{IN}$+$V_{DD}$–loss, and the second differential clock level translator 600 generates non-overlapping PMOS_CLK and PMOS_CLKB clock signals having a $V_{LOW}$=about $V_{OUT}$–$V_{DD}$+loss and a $V_{HIGH}$=about $V_{OUT}$. In both instances, the peak-to-peak output voltage $V_{OUT-PP}$ equals about $V_{DD}$–loss. In general, the loss is small, and accordingly, the differential clock level translators 500, 600 generate clock signals that enable gate-source voltages $V_{GS}$ ranging from 0V to about +$V_{DD}$ (for NMOS switches) or from zero 0V to about –$V_{DD}$ (for PMOS switches). The essentially full-range $V_{GS}$ voltage swings result in high efficiency switching of charge pump switches, since the ON resistance, RON, of a FET is much less when the $V_{GS}$ voltage is at a maximal value.

In addition, since the NMOS_CLK and NMOS_CLKB clock signals follow the state of PH2 and PH2B respectively, and the PMOS_CLK and PMOS_CLKB clock signals follow the state of PH1 and PH1B respectively, the differential clock level translators 500, 600 generate clock signals that follow the same timing rules: NMOS switches are turned OFF before PMOS switches are turned ON, and PMOS switches are turned OFF before NMOS switches are turned ON.

With respect to implementation details, the latch circuits of the differential clock level translators 500, 600 can be very small in an integrated circuit (IC) embodiment, since they are only needed for DC restoration of charge across their respective capacitors $C_{N1}$, $C_{N2}$ and $C_{P1}$, $C_{P2}$. Smaller circuits mean low loss and less load on the output driver circuitry of the non-overlapping clock generator 304. In addition, the capacitors $C_{N1}$, $C_{N2}$ and $C_{P1}$, $C_{P2}$ can be small since they need only be sized to drive the gates of the charge pump switches.

Example Charge Pump

Figure 7:
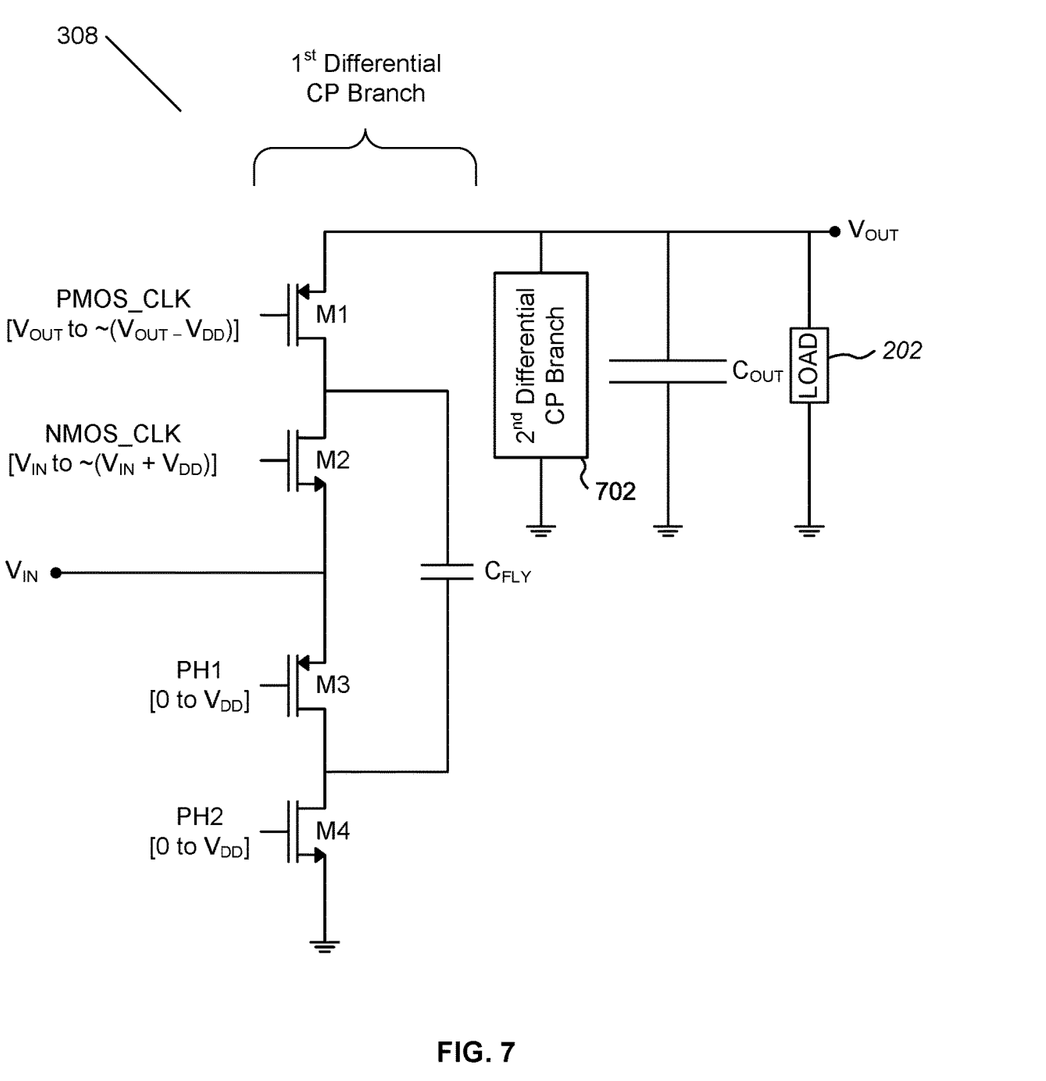
FIG. 7 is a schematic diagram of one embodiment of charge pump configured to be coupled to the non-overlapping clock generator and the differential clock level translator of FIG. 3.

FIG. 7 is a schematic diagram of one embodiment of charge pump 308 configured to be coupled to the non-overlapping clock generator 304 and the differential clock level translator 306 of FIG. 3. While similar in many respects to the charge pump 200 of FIG. 2, one notable difference is that the "upper" (output side) switches M1, M2 are controlled by the PMOS_CLK and NMOS_CLK non-overlapping clock signals. More specifically, switch M1 is controlled by the PMOS_CLK clock signal, which is a voltage translated version of PH1 (applied to switch M3) and has a voltage swing from $V_{OUT}$ to ~($V_{OUT}$–$V_{DD}$), and switch M2 is controlled by the NMOS_CLK clock signal, which is a voltage translated version of PH2 (applied to switch M4) and has a voltage swing from $V_{IN}$ to ~($V_{IN}$+$V_{DD}$). Thus, the magnitude of the $V_{GS-ON}$ voltage swing in both cases is about $V_{DD}$. This full-range voltage swing contrasts with conventional designs that result in a $V_{GS-ON}$=$V_{DD}$/2 for the upper switches.

The clock signals PH1 and PH2 generated by the non-overlapping clock generator 304 control the "lower" (ground side) switches M3, M4 and range from 0V to about $V_{DD}$ (thus, no level shifting is needed).

FIG. 7 also shows that a second differential charge pump branch 702 may be added in parallel with the illustrated charge pump (i.e., FETS M1-M4 and capacitor $C_{FLY}$, comprising a first differential charge pump branch). The second differential charge pump branch 702 may be controlled by the complementary clock signals output from the non-overlapping clock generator 304 and the differential clock level translator 306 (i.e., PH1B, PH2B and NMOS_CLKB, PMOS_CLKB, respectively). Additional charge pump branches may be added in a similar manner to accommodate higher loads, higher voltages, or different charge pump multiplication ratios.

Level-shifting non-overlapping clock signals for the upper switches M1, M2 such that they have a full-range voltage swing results in very high switching efficiency with no current shoot-through and resulting loss in a charge pump. In addition, the switches within a differential clock level translator 306 can be small, with the benefit noted above of imposing less load on the output driver circuitry of the non-overlapping clock generator 304. Further, since the level-shifted clock signals for the upper switches M1, M2 need only have a $V_{GS\text{-}ON}$ voltage that exceeds the threshold voltage $V_T$ of the switches, embodiments of the present invention can work at lower $V_{DD}$ values than conventional designs having a $V_{GS\text{-}ON}$ voltage of $V_{DD}/2$ (i.e., half the $V_{GS\text{-}ON}$ voltage of the present invention).

Note that the examples of this disclosure have focused on a charge pump having a 2× conversion ratio (also known as a voltage doubler). However, in some embodiments, the voltage source for the "lower" (ground side) switches may be different than the voltage source for the "upper" (output side) switches. For example, in FIG. 7, the ground-side switches M3, M4 may be connected between $V_{IN}$ and GND, while the output-side switches M1, M2 may be connected between a "$V_{IN}$" which would effectively be $2V_{IN}$ and a $V_{OUT}$ which would effectively be $3V_{IN}$. This would be the case, for example, in a charge pump having a 3× conversion ratio (also known as a voltage tripler). In addition, in some embodiments, the charge pump may have a negative conversion ratio (also known as an inverting charge pump). In inverting charge pumps, the output stage has $V_{IN}$ on top, $V_{NEG}$ ($V_{OUT}$) on the bottom, and ground (GND) in the middle. Accordingly, the teachings of this disclosure can be extended to other forms of charge pumps, such as triplers, inverters, doubling inverters, tripling inverters, etc. The same clock level translations apply to all of them, just the connections of the charge pump switches vary so that the clock level translators always reference the source voltage of the respective switches.

Methods

Figure 8:
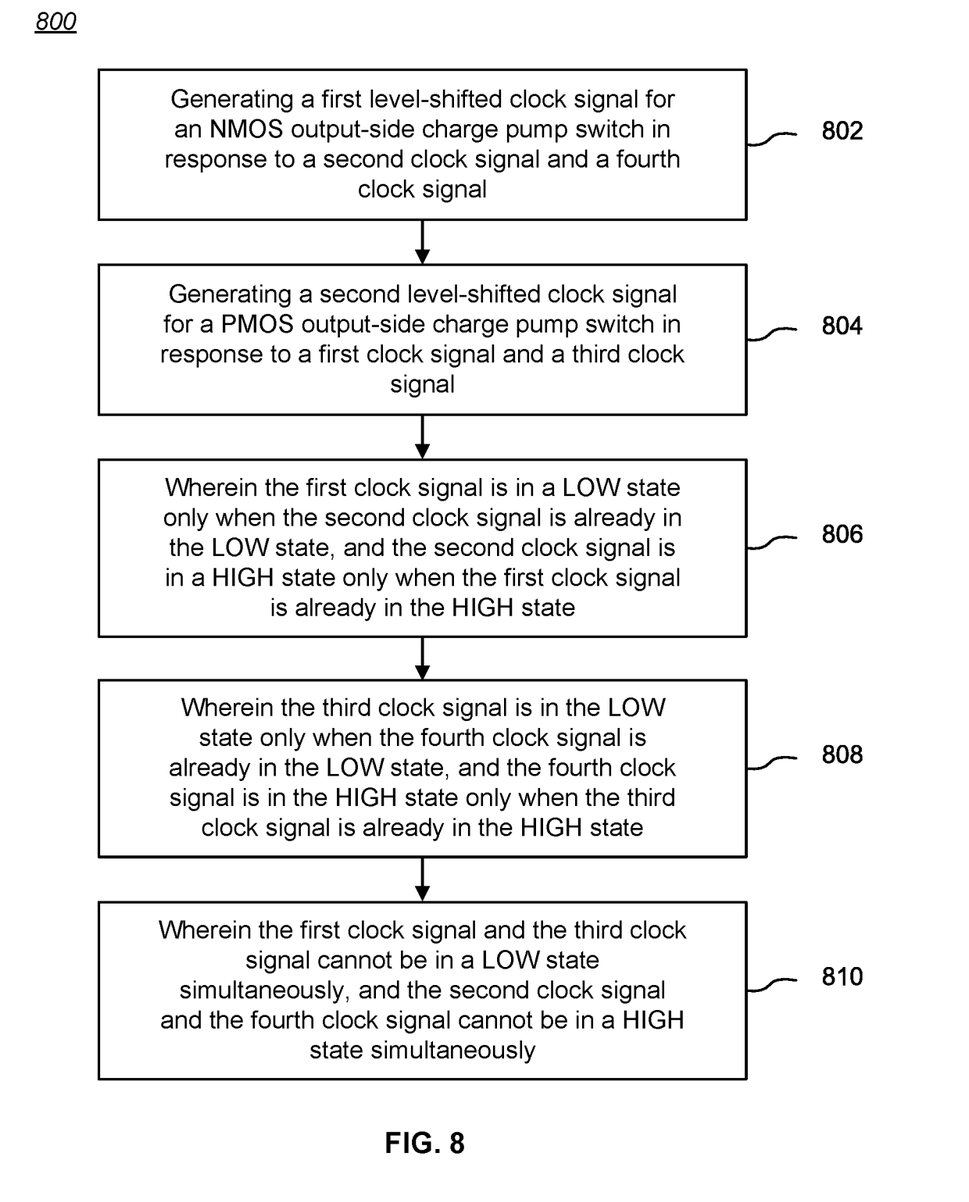
FIG. 8 is a process flow chart showing a first method of voltage level shifting clock signals to be applied to a charge pump.

Another aspect of the invention includes methods for voltage level shifting clock signals to be applied to a charge pump switches of a charge pump. For example, FIG. 8 is a process flow chart 800 showing a first method of voltage level shifting clock signals to be applied to a charge pump. The method includes: generating a first level-shifted clock signal for an NMOS output-side charge pump switch in response to a second clock signal and a fourth clock signal (Block 802); and generating a second level-shifted clock signal for a PMOS output-side charge pump switch in response to a first clock signal and a third clock signal (Block 804); wherein the first clock signal is in a LOW state only when the second clock signal is already in the LOW state, and the second clock signal is in a HIGH state only when the first clock signal is already in the HIGH state (Block 806), wherein the third clock signal is in the LOW state only when the fourth clock signal is already in the LOW state, and the fourth clock signal is in the HIGH state only when the third clock signal is already in the HIGH state (Block 808), and wherein the first clock signal and the third clock signal cannot be in a LOW state simultaneously, and the second clock signal and the fourth clock signal cannot be in a HIGH state simultaneously (Block 810).

Figure 9:
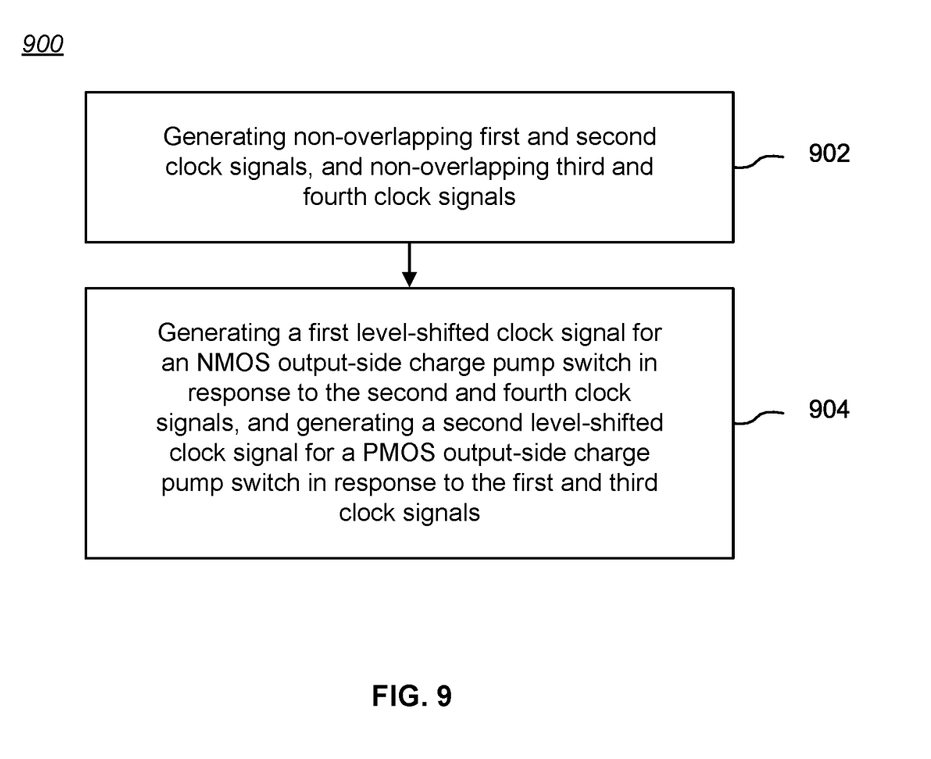
FIG. 9 is a process flow chart showing a second method of voltage level shifting clock signals to be applied to a charge pump.

As another example, FIG. 9 is a process flow chart 900 showing a second method of voltage level shifting clock signals to be applied to a charge pump. The method includes: generating non-overlapping first and second clock signals, and non-overlapping third and fourth clock signals (Block 902); and generating a first level-shifted clock signal for an NMOS output-side charge pump switch in response to the second and fourth clock signals, and generating a second level-shifted clock signal for a PMOS output-side charge pump switch in response to the first and third clock signals (Block 904).

Additional aspects of the above methods may include one or more of the following: wherein the first level-shifted clock signal and the second level-shifted clock signal have a voltage swing approximately equal in magnitude to the magnitude of an input voltage to the charge pump, or a circuit supply voltage, or a voltage derived from a clock driver coupled to the charge pump. For example, the clock driver may include a conventional logic translator (or be coupled to an intervening logic translator) that converts an input voltage swing to an output voltage swing. For instance, if the logic translator has $V_{DD\_IN}$ and $V_{DD\_OUT}$ voltage supplies, the logic signal swing at the input of the logic translator may be $V_{DD\_IN}$ while the logic swing at the output may be $V_{DD\_OUT}$ (discounting internal loss). The output of the clock driver would be coupled to $V_{DD\_IN}$ of the logic translator, while $V_{DD\_OUT}$ would be coupled to the charge pump. As is known in the art, the only limit on the logic swing at the output, $V_{DD\_OUT}$, is the output of a higher voltage supply to the logic translator. As another example, the clock driver may include a conventional clock amplitude doubler (or be coupled to an intervening clock amplitude doubler), which is a form of a charge pump in which the amplitude of the output logic is essentially $2V_{DD}$ (again discounting internal loss).

Fabrication Technologies & Options

The term "MOSFET", as used in this disclosure, includes any field effect transistor (FET) having an insulated gate whose voltage determines the conductivity of the transistor, and encompasses insulated gates having a metal or metal-like, insulator, and/or semiconductor structure. The terms "metal" or "metal-like" include at least one electrically conductive material (such as aluminum, copper, or other metal, or highly doped polysilicon, graphene, or other electrical conductor), "insulator" includes at least one insulating material (such as silicon oxide or other dielectric material), and "semiconductor" includes at least one semiconductor material.

As used in this disclosure, the term "radio frequency" (RF) refers to a rate of oscillation in the range of about 3 kHz to about 300 GHz. This term also includes the frequencies used in wireless communication systems. An RF frequency may be the frequency of an electromagnetic wave or of an alternating voltage or current in a circuit.

Various embodiments of the invention can be implemented to meet a wide variety of specifications. Unless otherwise noted above, selection of suitable component values is a matter of design choice. Various embodiments of the invention may be implemented in any suitable integrated circuit (IC) technology (including but not limited to MOSFET structures), or in hybrid or discrete circuit forms. Integrated circuit embodiments may be fabricated using any suitable substrates and processes, including but not limited to standard bulk silicon, silicon-on-insulator (SOI), and silicon-on-sapphire (SOS). Unless otherwise noted above, embodiments of the invention may be implemented in other transistor technologies such as BiCMOS, LDMOS, BCD, GaN HEMT, GaAs pHEMT, and MESFET technologies. However, embodiments of the invention are particularly useful when fabricated using an SOI or SOS based process, or when fabricated with processes having similar characteristics. Fabrication in CMOS using SOI or SOS processes enables circuits with low power consumption, the ability to withstand high power signals during operation due to FET stacking, good linearity, and high frequency operation (i.e., radio frequencies up to and exceeding 50 GHz). Monolithic IC implementation is particularly useful since parasitic capacitances generally can be kept low (or at a minimum, kept uniform across all units, permitting them to be compensated) by careful design.

Voltage levels may be adjusted, and/or voltage and/or logic signal polarities reversed, depending on a particular specification and/or implementing technology (e.g., NMOS, PMOS, or CMOS, and enhancement mode or depletion mode transistor devices). Component voltage, current, and power handling capabilities may be adapted as needed, for example, by adjusting device sizes, serially "stacking" components (particularly FETs) to withstand greater voltages, and/or using multiple components in parallel to handle greater currents. Additional circuit components may be added to enhance the capabilities of the disclosed circuits and/or to provide additional functionality without significantly altering the functionality of the disclosed circuits.

Circuits and devices in accordance with the present invention may be used alone or in combination with other components, circuits, and devices. Embodiments of the present invention may be fabricated as integrated circuits (ICs), which may be encased in IC packages and/or in modules for ease of handling, manufacture, and/or improved performance. In particular, IC embodiments of this invention are often used in modules in which one or more of such ICs are combined with other circuit blocks (e.g., filters, amplifiers, passive components, and possibly additional ICs) into one package. The ICs and/or modules are then typically combined with other components, often on a printed circuit board, to form an end product such as a cellular telephone, laptop computer, or electronic tablet, or to form a higher level module which may be used in a wide variety of products, such as vehicles, test equipment, medical devices, etc. Through various configurations of modules and assemblies, such ICs typically enable a mode of communication, often wireless communication.

CONCLUSION

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, and/or parallel fashion.

It is to be understood that the foregoing description is intended to illustrate and not to limit the scope of the invention, which is defined by the scope of the following claims, and that other embodiments are within the scope of the claims. In particular, the scope of the invention includes any and all feasible combinations of one or more of the processes, machines, manufactures, or compositions of matter set forth in the claims below. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

What is claimed is:

1. A differential clock level translator circuit configured to be coupled to a PMOS output-side charge pump switch and an NMOS output-side charge pump switch of a charge pump, the differential clock level translator circuit configured to generate a first level-shifted clock signal for the NMOS output-side charge pump switch in response to a second clock signal and a fourth clock signal, and to generate a second level-shifted clock signal for the PMOS output-side charge pump switch in response to a first clock signal and a third clock signal;
   wherein the first clock signal is in a LOW state only when the second clock signal is already in the LOW state, and the second clock signal is in a HIGH state only when the first clock signal is already in the HIGH state, wherein the third clock signal is in the LOW state only when the fourth clock signal is already in the LOW state, and the fourth clock signal is in the HIGH state only when the third clock signal is already in the HIGH state, and wherein the first clock signal and the third clock signal cannot be in a LOW state simultaneously, and the second clock signal and the fourth clock signal cannot be in a HIGH state simultaneously.

2. The invention of claim 1, wherein the first level-shifted clock signal has a low voltage level $V_{LOW}$ approximately equal in magnitude to the magnitude of an input voltage to the charge pump, and a high voltage level $V_{HIGH}$ approximately equal in magnitude to the magnitude of $V_{LOW}$ plus a voltage derived from a supply voltage to the non-overlapping clock generator minus some charge redistribution loss.

3. The invention of claim 1, wherein the second level-shifted clock signal has a low voltage level $V_{LOW}$ approximately equal in magnitude to the magnitude of an output voltage of the charge pump minus a voltage derived from a supply voltage to the non-overlapping clock generator plus some charge redistribution loss, and a high voltage level $V_{HIGH}$ approximately equal in magnitude to the magnitude of the output voltage of the charge pump.

4. The invention of claim 1, wherein the differential clock level translator circuit includes a PMOS clock latch including:
   (a) a first capacitor coupled to the first clock signal;
   (b) a second capacitor coupled to the third clock signal;
   (c) a first PMOS FET having a drain-source channel coupled between the first capacitor and an output voltage of the charge pump when coupled, and having a gate coupled to the second capacitor;
   (d) a second PMOS FET having a drain-source channel coupled between the second capacitor and the output voltage of the charge pump when coupled, and having a gate coupled to the first capacitor;
   wherein the second level-shifted clock signal is output from a node between the first capacitor and the drain-source channel of the first PMOS FET.

5. The invention of claim 1, wherein the differential clock level translator circuit includes an NMOS clock latch including:
   (a) a first capacitor coupled to the second clock signal;
   (b) a second capacitor coupled to the fourth clock signal;
   (c) a first NMOS FET having a drain-source channel coupled between the first capacitor and an input voltage of the charge pump when coupled, and having a gate coupled to the second capacitor;
   (d) a second NMOS FET having a drain-source channel coupled between the second capacitor and the input voltage of the charge pump when coupled, and having a gate coupled to the first capacitor;
   wherein the first level-shifted clock signal is output from a node between the first capacitor and the drain-source channel of the first NMOS FET.

6. A voltage level shifting circuit configured to be coupled to a charge pump having a PMOS output-side charge pump switch and an NMOS output-side charge pump switch, including:
  (a) a non-overlapping clock generator configured to output non-overlapping first and second clock signals, and non-overlapping third and fourth clock signals; and
  (b) a differential clock level translator circuit, coupled to the non-overlapping clock generator and configured to be coupled to the PMOS output-side charge pump switch and the NMOS output-side charge pump switch of the charge pump, wherein the differential clock level translator circuit generates a first level-shifted clock signal for the NMOS output-side charge pump switch in response to the second and fourth clock signals, and wherein the differential clock level translator circuit generates a second level-shifted clock signal for the PMOS output-side charge pump switch in response to the first and third clock signals.

7. The invention of claim 6, wherein the first level-shifted clock signal has a low voltage level $V_{LOW}$ approximately equal in magnitude to the magnitude of an input voltage to the charge pump, and a high voltage level $V_{HIGH}$ approximately equal in magnitude to the magnitude of $V_{LOW}$ plus a voltage derived from a supply voltage to the non-overlapping clock generator minus some charge redistribution loss.

8. The invention of claim 6, wherein the second level-shifted clock signal has a low voltage level $V_{LOW}$ approximately equal in magnitude to the magnitude of an output voltage of the charge pump minus a voltage derived from a supply voltage to the non-overlapping clock generator plus some charge redistribution loss, and a high voltage level $V_{HIGH}$ approximately equal in magnitude to the magnitude of the output voltage of the charge pump.

9. The invention of claim 6, wherein the differential clock level translator circuit includes a PMOS clock latch including:
  (a) a first capacitor coupled to the first clock signal;
  (b) a second capacitor coupled to the third clock signal;
  (c) a first PMOS FET having a drain-source channel coupled between the first capacitor and an output voltage of the charge pump when coupled, and having a gate coupled to the second capacitor;
  (d) a second PMOS FET having a drain-source channel coupled between the second capacitor and the output voltage of the charge pump when coupled, and having a gate coupled to the first capacitor;
  wherein the second level-shifted clock signal is output from a node between the first capacitor and the drain-source channel of the first PMOS FET.

10. The invention of claim 6, wherein the differential clock level translator circuit includes an NMOS clock latch including:
  (a) a first capacitor coupled to the second clock signal;
  (b) a second capacitor coupled to the fourth clock signal;
  (c) a first NMOS FET having a drain-source channel coupled between the first capacitor and an input voltage of the charge pump when coupled, and having a gate coupled to the second capacitor;
  (d) a second NMOS FET having a drain-source channel coupled between the second capacitor and the input voltage of the charge pump when coupled, and having a gate coupled to the first capacitor;
  wherein the first level-shifted clock signal is output from a node between the first capacitor and the drain-source channel of the first NMOS FET.

11. A voltage level shifting circuit configured to be coupled to a charge pump having a PMOS output-side charge pump switch and an NMOS output-side charge pump switch, including:
  (a) a non-overlapping clock generator configured to output a first clock signal, a second clock signal, a third clock signal, and a fourth clock signal, each clock signal having a LOW state and a HIGH state, wherein the first clock signal is in the LOW state only when the second clock signal is already in the LOW state, and the second clock signal is in the HIGH state only when the first clock signal is already in the HIGH state, wherein the third clock signal is in the LOW state only when the fourth clock signal is already in the LOW state, and the fourth clock signal is in the HIGH state only when the third clock signal is already in the HIGH state, and wherein the first clock signal and the third clock signal cannot be in a LOW state simultaneously, and the second clock signal and the fourth clock signal cannot be in a HIGH state simultaneously; and
  (b) a differential clock level translator circuit, coupled to the non-overlapping clock generator and configured to be coupled to the PMOS output-side charge pump switch and the NMOS output-side charge pump switch of the charge pump, wherein the differential clock level translator circuit generates a first level-shifted clock signal for the NMOS output-side charge pump switch in response to the second clock signal and the fourth clock signal, and wherein the differential clock level translator circuit generates a second level-shifted clock signal for the PMOS output-side charge pump switch in response to the first clock signal and the third clock signal.

12. The invention of claim 11, wherein the first level-shifted clock signal has a low voltage level $V_{LOW}$ approximately equal in magnitude to the magnitude of an input voltage to the charge pump, and a high voltage level $V_{HIGH}$ approximately equal in magnitude to the magnitude of $V_{LOW}$ plus a voltage derived from a supply voltage to the non-overlapping clock generator minus some charge redistribution loss.

13. The invention of claim 11, wherein the second level-shifted clock signal has a low voltage level $V_{LOW}$ approximately equal in magnitude to the magnitude of an output voltage of the charge pump minus a voltage derived from a supply voltage to the non-overlapping clock generator plus some charge redistribution loss, and a high voltage level $V_{HIGH}$ approximately equal in magnitude to the magnitude of the output voltage of the charge pump.

14. The invention of claim 11, wherein the differential clock level translator circuit includes a PMOS clock latch including:
  (a) a first capacitor coupled to the first clock signal;
  (b) a second capacitor coupled to the third clock signal;
  (c) a first PMOS FET having a drain-source channel coupled between the first capacitor and an output voltage of the charge pump when coupled, and having a gate coupled to the second capacitor;
  (d) a second PMOS FET having a drain-source channel coupled between the second capacitor and the output voltage of the charge pump when coupled, and having a gate coupled to the first capacitor;
  wherein the second level-shifted clock signal is output from a node between the first capacitor and the drain-source channel of the first PMOS FET.

15. The invention of claim 11, wherein the differential clock level translator circuit includes an NMOS clock latch including:
- (a) a first capacitor coupled to the second clock signal;
- (b) a second capacitor coupled to the fourth clock signal;
- (c) a first NMOS FET having a drain-source channel coupled between the first capacitor and an input voltage of the charge pump when coupled, and having a gate coupled to the second capacitor;
- (d) a second NMOS FET having a drain-source channel coupled between the second capacitor and the input voltage of the charge pump when coupled, and having a gate coupled to the first capacitor;
- wherein the first level-shifted clock signal is output from a node between the first capacitor and the drain-source channel of the first NMOS FET.

* * * * *